(12) United States Patent
Tiwari et al.

(10) Patent No.: US 10,789,265 B2
(45) Date of Patent: Sep. 29, 2020

(54) DATA MIGRATION SYSTEM

(71) Applicant: Accenture Global Solutions Limited, Dublin (IE)

(72) Inventors: Sanjay Tiwari, Bellandur Village (IN); Devendra Gautam, Bellandur Village (IN); Nithyanandan Periasamy Dhanapal, Bangalore (IN); Surya Kumar Venkata Gangadhara Idumudi, Chennai (IN); Nikhil Varshney, Bangalore (IN); Ranjana B Narawane, Mumbai (IN)

(73) Assignee: Accenture Global Solutions Limited, Dublin (IE)

(*) Notice: Subject to any disclaimer, the term of this patent is extended or adjusted under 35 U.S.C. 154(b) by 118 days.

(21) Appl. No.: 16/115,265

(22) Filed: Aug. 28, 2018

(65) Prior Publication Data

US 2019/0197171 A1 Jun. 27, 2019

(30) Foreign Application Priority Data

Dec. 22, 2017 (IN) .............................. 201741046267

(51) Int. Cl.
*G06F 16/25* (2019.01)
*G06F 11/07* (2006.01)
*G06F 16/21* (2019.01)

(52) U.S. Cl.
CPC .......... *G06F 16/258* (2019.01); *G06F 11/079* (2013.01); *G06F 16/213* (2019.01)

(58) Field of Classification Search
CPC .... G06F 16/213; G06F 16/214; G06F 16/258; G06F 11/073; G06F 11/0772; G06F 11/079
See application file for complete search history.

(56) References Cited

U.S. PATENT DOCUMENTS

| | | | |
|---|---|---|---|
| 6,081,811 A * | 6/2000 | Nilsson | G06F 16/258 |
| 8,150,896 B2 * | 4/2012 | Cotichini | G06F 16/214 |
| | | | 707/810 |
| 8,380,661 B2 | 2/2013 | Richards et al. | |
| 8,473,458 B2 | 6/2013 | Yambal et al. | |

(Continued)

*Primary Examiner* — Joseph R Kudirka
(74) *Attorney, Agent, or Firm* — Brinks Gilson & Lione

(57) ABSTRACT

A system for migrating data from a legacy system to a target system includes an input/output (IO) processor configured to receive legacy data from a plurality of different types of legacy systems and to communicate target data to a plurality of different types of target systems; a staging area database configured to store legacy data according to a common database schema; a localized database configured to store target data according to a target schema that is associated with a target system type; a processor in communication with the interface, the staging area database, and the localized database; and non-transitory computer readable media in communication with the processor that stores instruction code. The instruction codes is executed by the processor and causes the processor to: determine a target schema associated with a target system type; convert the legacy data stored in the staging area database to localized data according to the determined target schema; store the localized data in the localized database; and communicate the localized data to the target system.

20 Claims, 15 Drawing Sheets

(56) References Cited

U.S. PATENT DOCUMENTS

| | | |
|---|---|---|
| 8,666,919 B2 | 3/2014 | Miranda et al. |
| 8,751,627 B2 | 6/2014 | Liu et al. |
| 8,793,167 B2 * | 7/2014 | Menezes ............... G06F 16/254 705/30 |
| 8,862,600 B2 | 10/2014 | Nagarajan et al. |
| 9,430,506 B2 | 8/2016 | Schuenzel et al. |
| 9,514,164 B1 | 12/2016 | Matic et al. |
| 9,516,119 B2 | 12/2016 | Bultema et al. |
| 2005/0071359 A1* | 3/2005 | Elandassery .......... G06F 16/213 |
| 2006/0235899 A1* | 10/2006 | Tucker .................. G06F 16/214 |
| 2008/0306986 A1* | 12/2008 | Doyle, Sr. ................ G06F 8/51 |
| 2017/0060974 A1* | 3/2017 | Dudhani ............... G06F 16/258 |
| 2017/0116296 A1* | 4/2017 | Specht .................. G06F 16/214 |
| 2018/0107466 A1 | 4/2018 | Rihani |
| 2018/0157726 A1* | 6/2018 | Shah ..................... G06F 16/252 |
| 2019/0182323 A1 | 6/2019 | Srinivasan et al. |

* cited by examiner

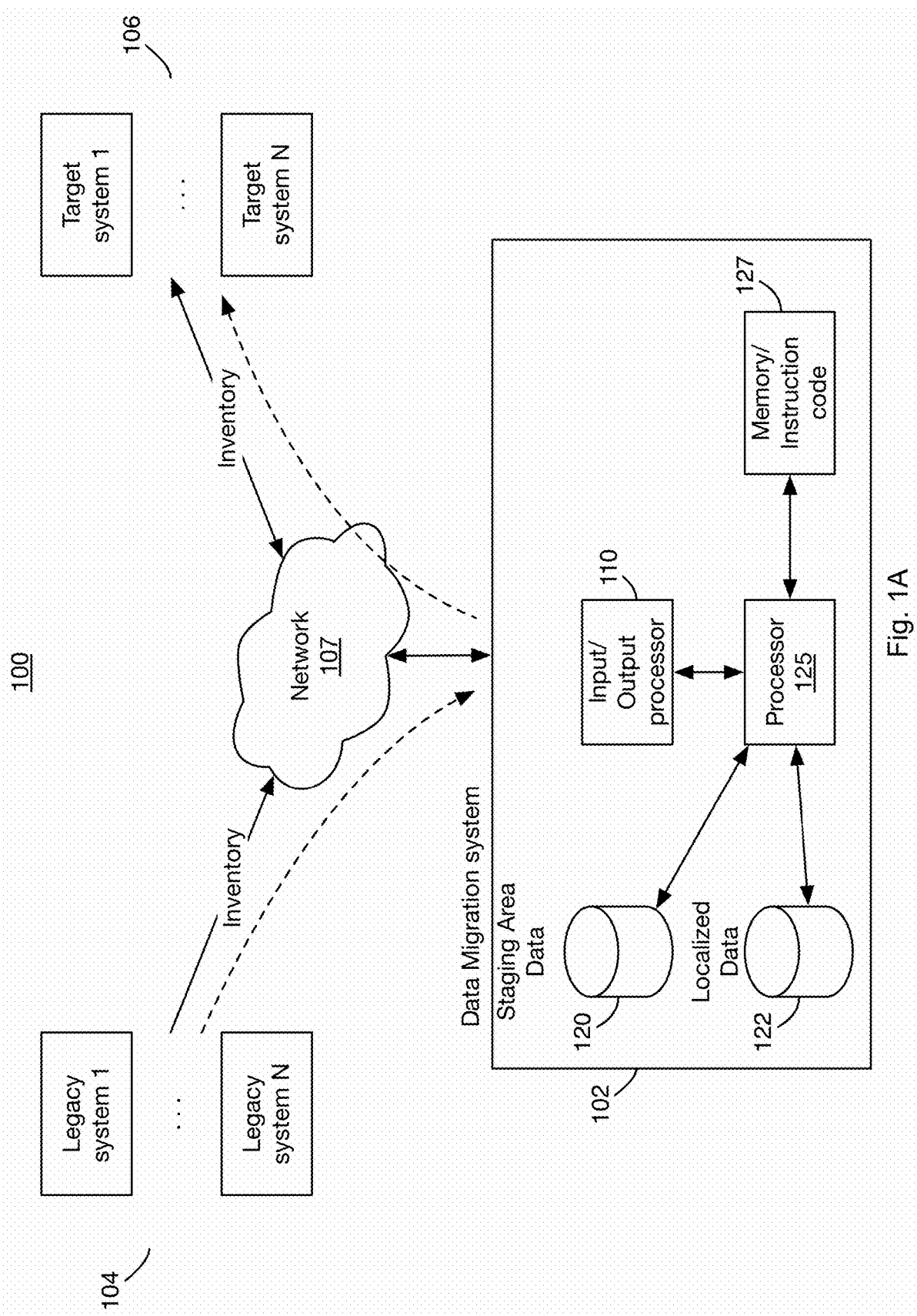

Fig. 1B

| COLUMN_NAME | DATA_TYPE | NULLABLE | DATA_DEFAULT | COLUMN_ID | COMMENTS |
| --- | --- | --- | --- | --- | --- |
| 1 JOBID | NUMBER(10,0) | Yes | (null) | 1 | (null) |
| 2 ENTITY_NAME | VARCHAR2(255 BYTE) | Yes | (null) | 2 | (null) |
| 3 ENTITY_VALUE | VARCHAR2(255 BYTE) | Yes | (null) | 3 | (null) |
| 4 DEVICE_ID | VARCHAR2(255 BYTE) | Yes | (null) | 4 | (null) |
| 5 LABEL | VARCHAR2(255 BYTE) | Yes | (null) | 5 | (null) |
| 6 VALUE | VARCHAR2(255 BYTE) | Yes | (null) | 6 | (null) |
| 7 MIGR_STATUS | VARCHAR2(255 BYTE) | Yes | (null) | 7 | (null) |

Fig. 1C

| COLUMN_NAME | DATA_TYPE | NULLABLE | DATA_DEFAULT | COLUMN_ID | COMMENTS |
|---|---|---|---|---|---|
| JOBID | NUMBER(10,0) | Yes | (null) | 1 | (null) |
| TELEPHONE_N... | VARCHAR2(255 BYTE) | Yes | (null) | 2 | (null) |
| CREATED_DATE | TIMESTAMP(6) WITH LOCAL TIME ZONE | Yes | (null) | 3 | (null) |
| MODIFIED_DATE | TIMESTAMP(6) WITH LOCAL TIME ZONE | Yes | (null) | 4 | (null) |
| STATUS | VARCHAR2(255 BYTE) | Yes | (null) | 5 | (null) |
| ENTITY_NAME | VARCHAR2(255 BYTE) | Yes | (null) | 6 | (null) |
| MIGR_STATUS | VARCHAR2(255 BYTE) | Yes | (null) | 7 | (null) |
| IN_DESC | VARCHAR2(255 BYTE) | Yes | (null) | 8 | (null) |
| DIM_ENTITY_ID | VARCHAR2(255 BYTE) | Yes | (null) | 9 | (null) |

Fig. 1D

| JOBID | ENTITY_NAME | ENTITY_VALUE | DEVICE_ID | LABEL | VALUE | MIGR_S... |
|---|---|---|---|---|---|---|
| 1 | 2121 TELEPHONENUMBER | (null) | 8259511623 | TN_Type | Normal | (null) |
| 2 | 2121 TELEPHONENUMBER | (null) | 8259511623 | Ownership | Native | (null) |
| 3 | 2121 TELEPHONENUMBER | (null) | 8259511623 | PORT_St... | (null) | (null) |

Fig. 1E

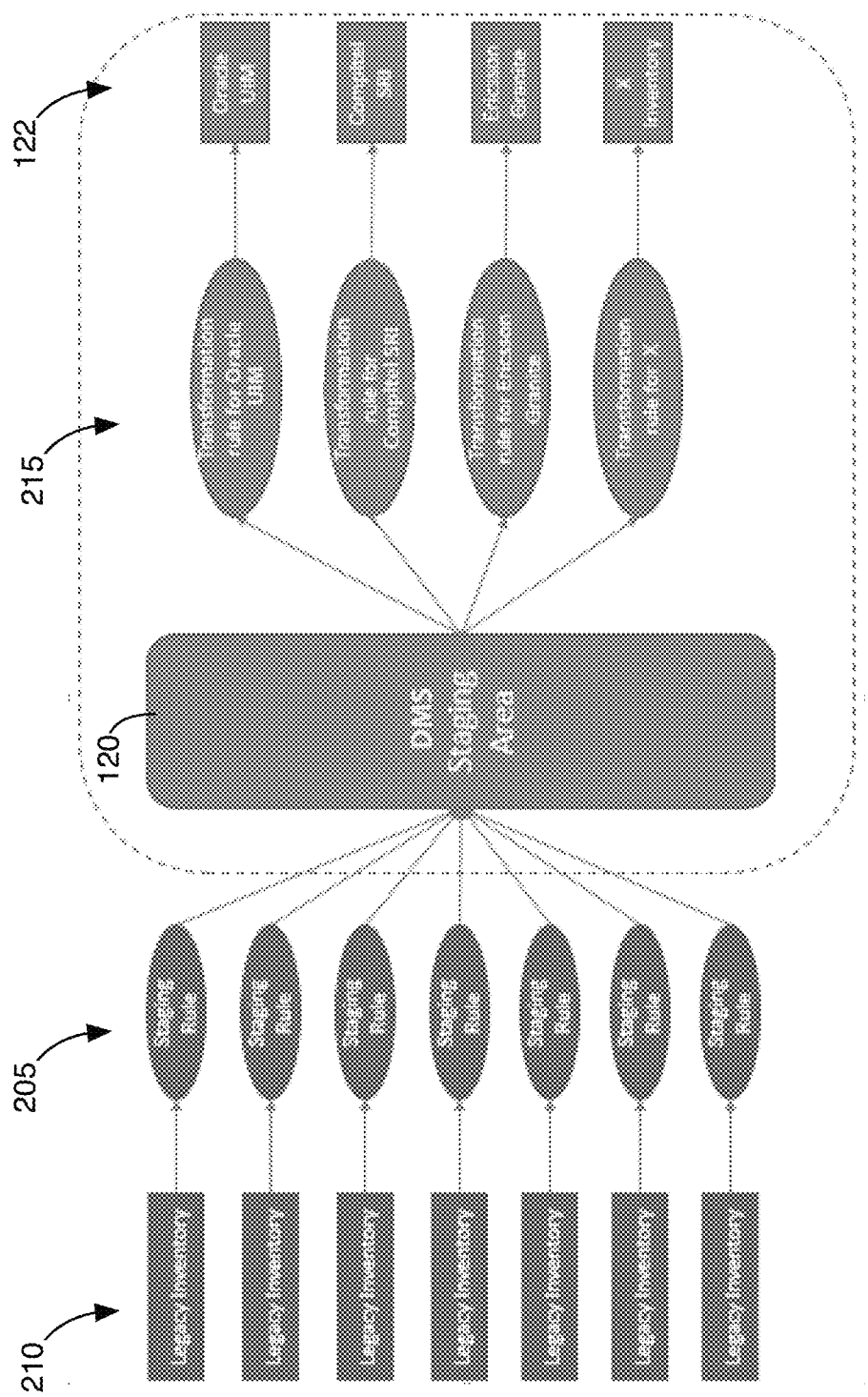

Fig. 4F

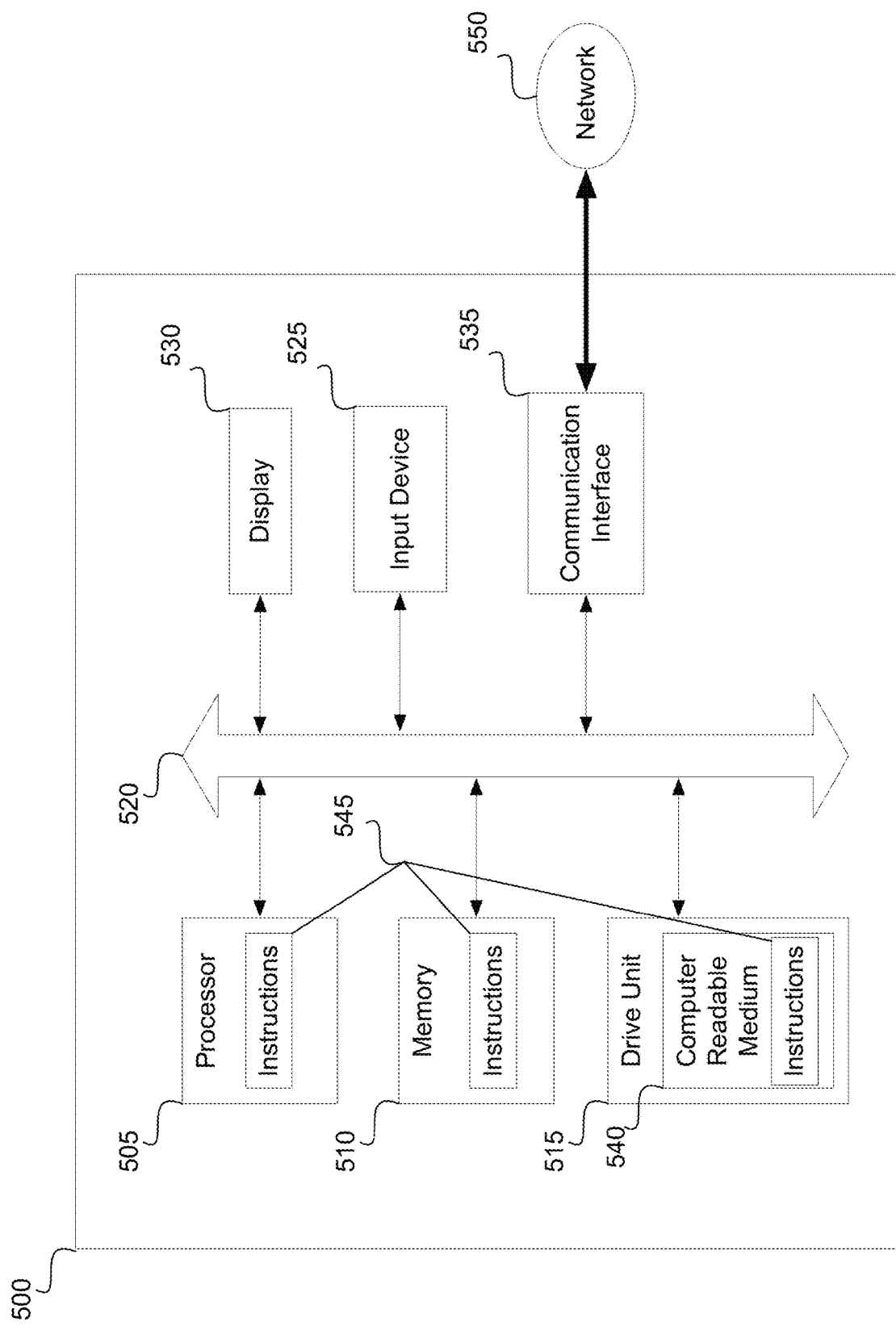

DATA MIGRATION SYSTEM

RELATED APPLICATIONS

This application claims the benefit of priority under 35 U.S.C. § 119(a) to Indian Patent Application No. 201741046267, filed Dec. 22, 2017, the content of which is hereby incorporated by reference in its entirety.

BACKGROUND

Field

This application generally relates to data management within an enterprise. In particular, this application describes a system and method for transferring data from a legacy (i.e. existing) system to a target (i.e. new) system.

Description of Related Art

Companies typically utilize systems such as enterprise resources planning (ERP) systems, customer relationship management (CRM) systems, supply chain management (SCM) systems, etc., to integrate management functions of core business processes of the enterprise such as marketing processes, sales processes, logistics processes, etc. Data associated with inventory of the company (e.g., products, services, etc.) may be stored in one or more databases utilized by these systems. For example, data/inventory for a telecom operator may include entities related to customer accounts, phone numbers, types of devices, etc.

From time to time, a company may find the need to upgrade management systems to stay current. To do so, custom data transfer scripts may be developed to transfer data stored in the legacy (i.e. existing) system(s) to the target (i.e. new) system(s). Data may be transferred in a somewhat serialized manner.

In some cases, the new system may generate a transfer error when, for example, the data is in the incorrect format, required fields are missing, etc. The error may be generated at any point in the transfer process. When this occurs, the new system may refuse to accept additional information and the data migration process may be halted. To address this issue, an operator must determine the cause of the error, update one or more data transfer scripts to correct the issue causing the error, and re-run the data transfer scripts.

Unfortunately, when the scripts are re-run, any previous data transfer progress is lost, thus requiring that the data from the previous session be re-transferred. Having to re-transfer all of the data can be time consuming and may tie up critical processing and network bandwidth. This problem is exacerbated as the amount of data to transfer is increases.

SUMMARY

In a first aspect, a system for migrating data from a legacy system to a target system is provided. The system includes an input/output (IO) processor, a staging area database, a localized database, a processor, and non-transitory computer readable media. The input/output (IO) processor is configured to receive legacy data from a plurality of different types of legacy systems and to communicate target data to a plurality of different types of target systems. The staging area database is configured to store legacy data according to a common database schema. The localized database is configured to store target data according to a target schema that is associated with a target system type. The processor is in communication with the interface, the staging area database, and the localized database. The non-transitory computer readable media is in communication with the processor and stores instruction code. When executed by the processor, the instruction code causes the processor to determine a target schema associated with a target system type; convert the legacy data stored in the staging area database to localized data according to the determined target schema; store the localized data in the localized database; and communicate the localized data to the target system.

In a second aspect, a method for migrating data from a legacy system to a target system is provided. The method includes receiving, via an input/output (IO) processor, legacy data from a plurality of different types of legacy systems. Legacy data is stored to a staging area database according to a common database schema. A target schema associated with a target system type is determined. The legacy data stored in the staging area database is converted to localized data according to the determined target schema. The localized data is stored in the localized database and communicated to the target system.

In a third aspect, non-transitory computer readable media that has instruction code stored thereon for migrating data from a legacy system to a target system is provided. The instruction code is executable on a machine for causing the machine to perform acts that include receiving legacy data from a plurality of different types of legacy systems, and storing the legacy data to a staging area database according to a common database schema. The instruction code causes the machine to determine a target schema associated with a target system type, and convert the legacy data stored in the staging area database to localized data according to the determined target schema. The instruction code causes the machine to store the localized data in the localized database; and communicate the localized data to the target system.

BRIEF DESCRIPTION OF THE DRAWINGS

FIG. 1A illustrates an exemplary data migration system (DMS) that facilitates migrating data from a legacy system to a target system;

FIGS. 1B-1E illustrate various tables of information utilized by the DMS;

FIGS. 2A and 2B illustrate logical views of the flow of data from a given legacy system to a given target system;

Figure 4F:
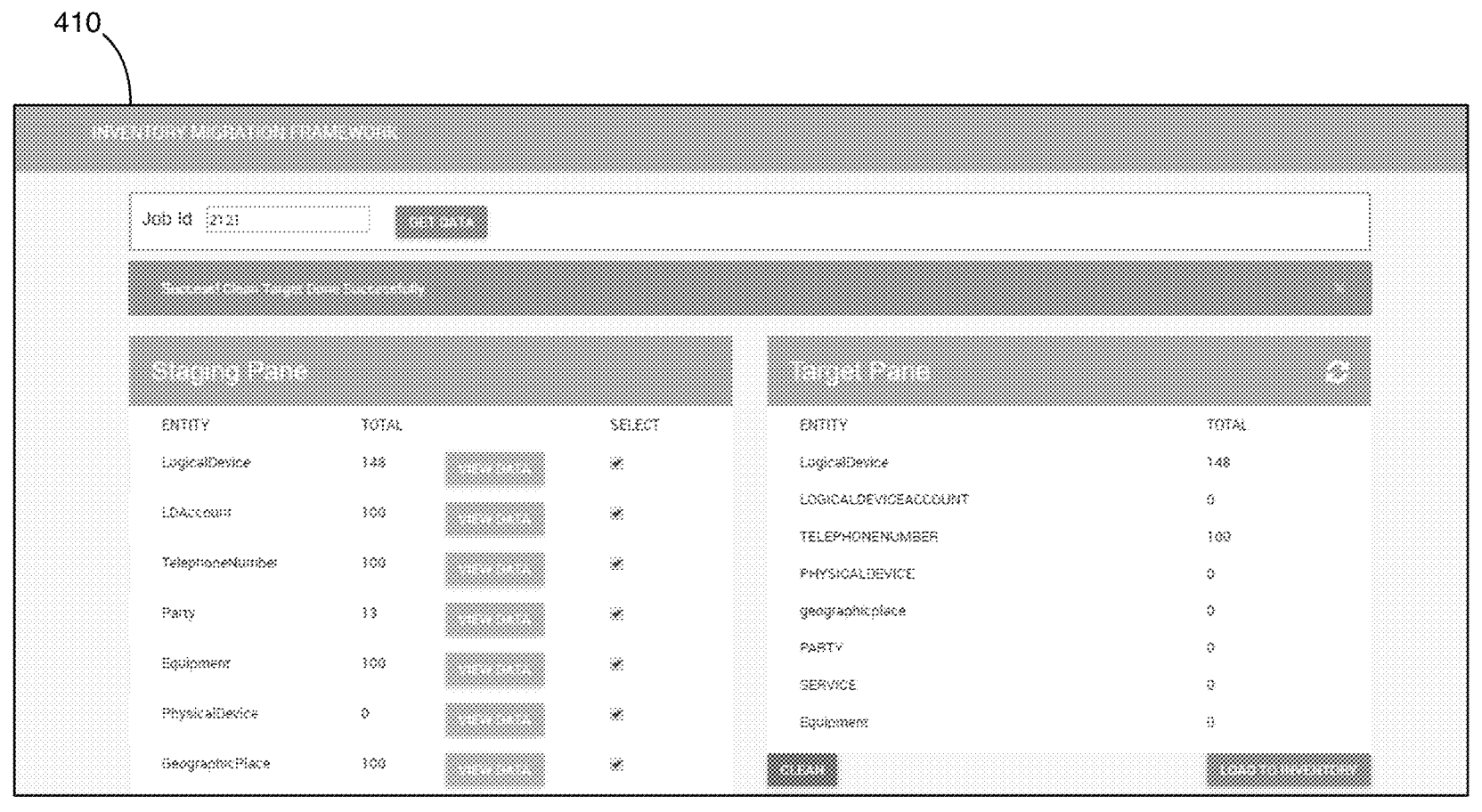

FIGS. 4A-4F illustrate exemplary interfaces that may be generated by the DMS to facilitate migrating data from a legacy system to a target system; and FIG. 5 illustrates an exemplary computer system that may form part of or implement the systems described in the figures or in the following paragraphs.

DETAILED DESCRIPTION

Figure 2B:
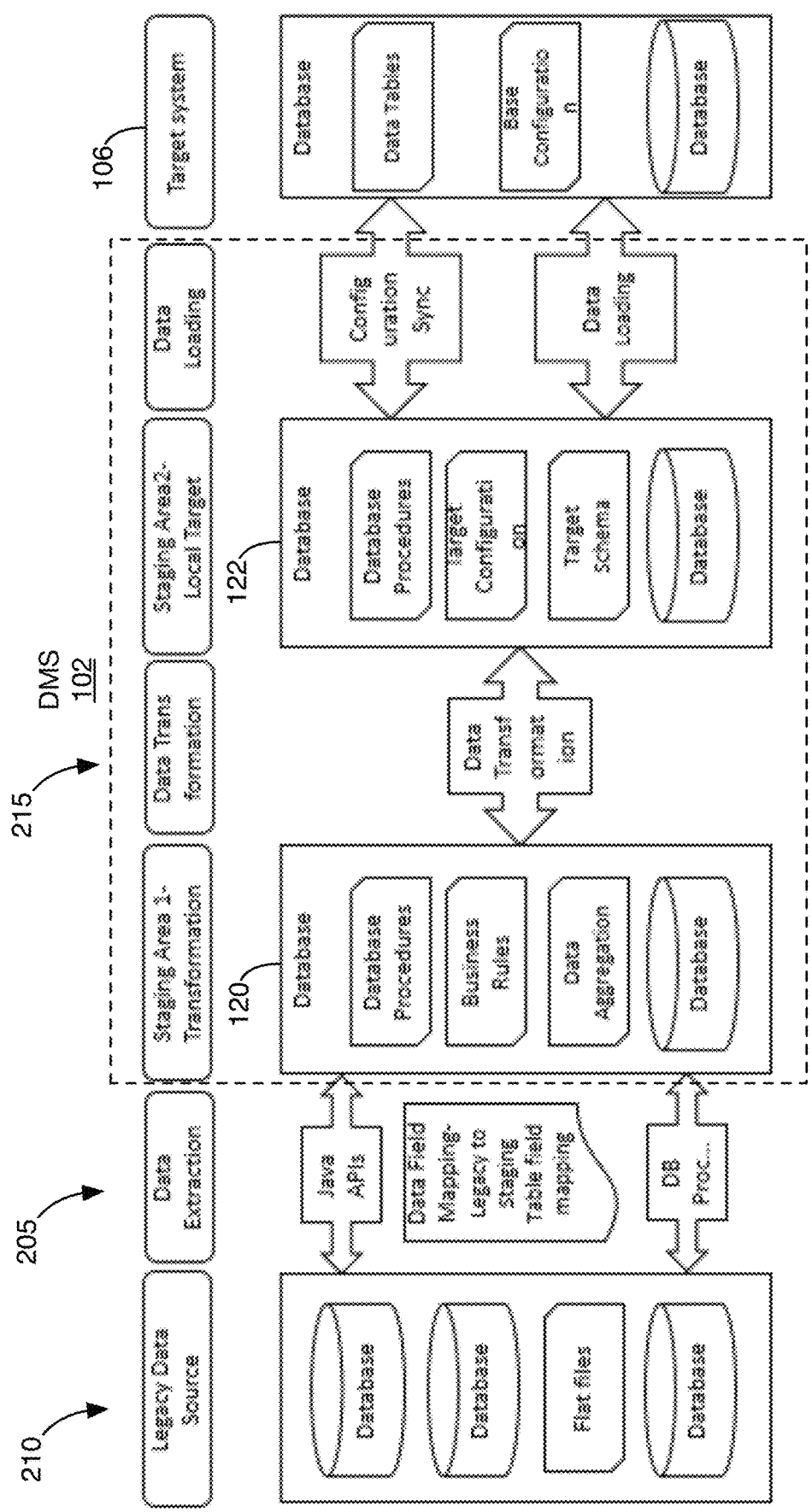

The embodiments described below overcome the problems described in the background by providing a data migration system that facilitates piecewise transfer of data from a legacy to a target system. If an error is detected with respect to a portion of the data, the system is configured to allow for the reprocessing of just the portion of data associated with the error. Previously processed data for which errors have not been detected does not need to be reprocessed. This advantageously reduces the number of network transactions that would otherwise be required to transfer the data between the legacy and target systems. As a result, the system uses less power and computational resources than prior systems because redundant operations present in those prior systems are eliminated.

Figure 1B:
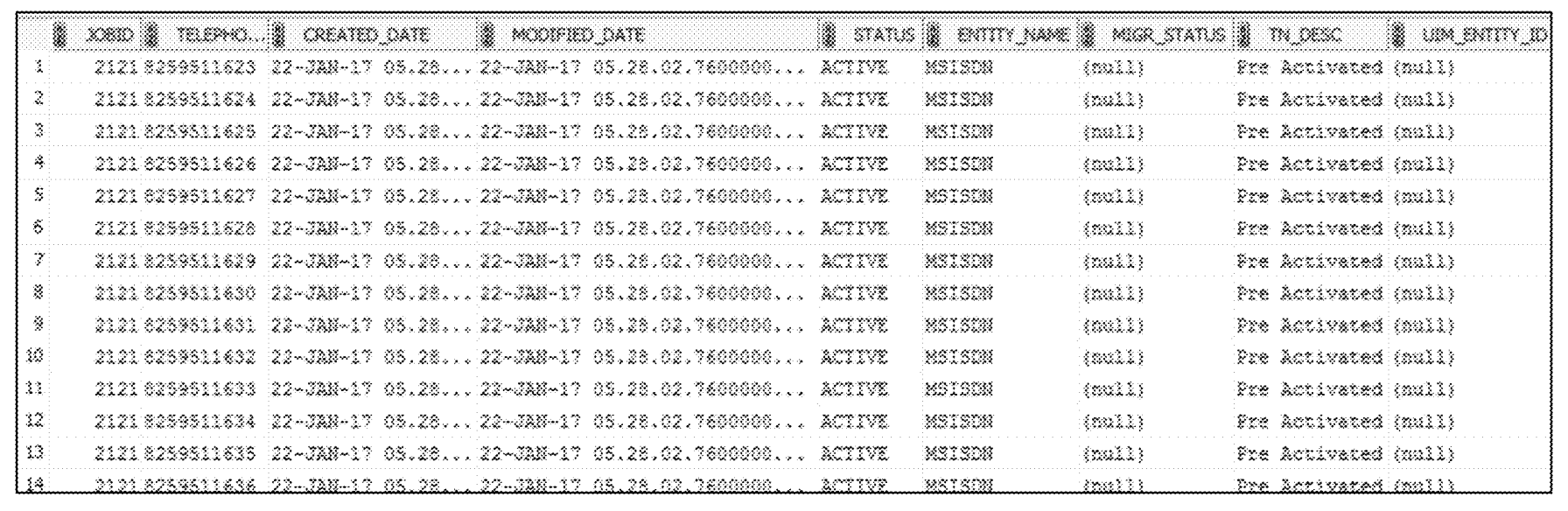

FIG. 1A illustrates an exemplary environment 100 that includes various systems/devices that facilitate migrating data from a legacy system 104 to a target system 106. Exemplary systems/devices of the environment 100 include a data migration system (DMS) 102, a group of legacy systems 104, and a group of target systems 106. The DMS 102, legacy systems 104, and target systems 106 may communicate with one another via a network 107, such as the Internet.

The legacy systems 104 and target systems 106 may correspond to computer systems such as an Intel®, AMD®, or PowerPC® based computer system or a different computer system and can include application specific computer systems. The computer systems may include an operating system, such as Microsoft Windows®, Linux, Unix® or other operating system. The terminals may be desktop PCs and/or mobile terminals.

In one implementation, the legacy systems 104 and target systems 106 may be configured to perform the functions of an operation support system (OSS) such as managing network inventory, service provisioning, network configuration and fault management. The legacy system 104 may be the original OSS a company is using, and the target system 106 may be a next generation OSS (NGOSS) the company wishes to migrate to. For example, the NGOSS may correspond to systems such as Oracle UIM, Amdocs Creamer, Nutcracker, Ericsson Granite.

The DMS 102 implements specific logic that facilitates migrating information from a legacy system 104 to a target system 106. To facilitate performing these operations, the DMS 102 may include a processor 125, input/output processor 110, a staging area database 120, and a localized data database 122. The DMS 102 may include other subsystems.

The I/O processor 110 of the DMS 102 is configured to facilitate communications with entities outside of the DMS 102. In this regard, the I/O processor 110 may be configured to dynamically determine the communication methodology utilized by entities of the environment 100 for communicating information to the entities using the determined communication methodology. For example, the I/O processor 110 may determine that a first entity (i.e., legacy system 104) utilizes a RESTful API and may, therefore, communicate with the entity using a RESTful communication methodology.

As described in more detail below, the I/O processor 110 may implement a web browser to facilitate generating one or more web-based interfaces through which users may interact with the DMS 102. The web browser may implement a web services interface to facilitate automating some of the web-based functionality via a computer. For example, one or more of the entities of the environment 100 may utilize the web services interfaces to access information stored by the DMS 102.

The staging area database 120 stores data received from a legacy system 104. To facilitate data migration, each legacy system 104 may implement specific logic or rules for communicating the information to the DMS 102 in such a way as to populate the staging area database 120 with legacy data according to a common schema. In this regard, a common schema may be defined differently for different industry types. For example, a common schema suited for the telecom industry may be defined. That is, the same common telecom schema may be utilized for any telecom company that desires to migrate data from its legacy system(s) 104 to a target system 106 regardless of the choice of target system 106. The table of FIG. 1B illustrates an exemplary Telephone Number entity table that may be one of several entity tables defined within a common schema utilized by the telecom industry. The table of FIG. 1C defines the data type for each field in the table of FIG. 1B.

The localized data database 122 stores data that is intended to be communicated to a target system 106. The DMS 102 may implement specific logic or rules to facilitate communicating the information from the staging area database 120 to the localized data database 122 according to a target schema required by a target system 106. In this regard, the target schema may be defined differently for each target system 106. For example, different NGOSSs (e.g., Oracle UIM, Amdocs Creamer, Nutcracker, Ericsson Granite) may require different schemas. Tables 3 and 4 below illustrate an exemplary target schema information that may be utilized for a specific target system. The table of FIG. 1D is designed to hold custom attributes of any entity type to be migrated. The table of FIG. 1E shows how custom attributes associated with a specific telephone number (i.e., 8259511623) have been stored.

FIGS. 2A and 2B illustrate logical views of the flow of data from a given legacy system 104 to a given target system 106. As shown, staging rules/scripts 205 may be created for inventory/data 210 stored in a given legacy system 104 to facilitate receiving the data 210 from the legacy system 104 in whatever format the legacy system 104 provides the data 210. The rules/scripts 205 are further configured to communicate the data 210 to the staging area database 120 in the DMS 102 according to the common schema associated with an industry type associated with the legacy system 104. For example, staging rules/scripts may correspond to Java code that is configured to receive the inventory/data 210 from a legacy system 104 such as a telephone system and to arrange the received data into a table such as the table of FIG. 1B. In some implementations the script may convert data as the data is transferred into a common format. For example, the common schema may require that dates may be expressed as six digit codes. In a case where the legacy system 104 represents the date differently (e.g., Jan. 1, 2018) the script may convert the date (e.g., 01/01/18).

Transformation rules/scripts 215 may be created for each target system 106 to receive data from the staging area database 120 and to communicate the data to a localized data database 220 associated with a given target system 106 according a schema associated with the target system 106. For example, a transformation rules/scripts 215 may correspond to Java code that is configured to receive data from the staging area database 120 that is expressed using the common schema (e.g., the table of FIG. 1B), and to transfer the data to the localized data database 122. While transferring the data, the transformation rules/scripts 215 may convert the data into a format specifically required for a particular target system 106 according to a schema associated with the target system 106 (e.g., the table of FIG. 1D).

The processor 125 executes instruction code stored in a memory device 127 for coordinating activities performed between the various subsystems noted above. The processor 125 may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system.

It is contemplated that the I/O processor 110 and any other subsystem referenced herein may correspond to a stand-alone computer system such as an Intel®, AMD®, or PowerPC® based computer system or a different computer system and can include application specific computer systems. The computer systems may include an operating system, such as Microsoft Windows®, Linux, Unix® or other operating system. It is also contemplated that operations performed on the various subsystems may be combined into a fewer or greater number of subsystems to facilitate speed scaling, cost reductions, etc.

Figure 3:
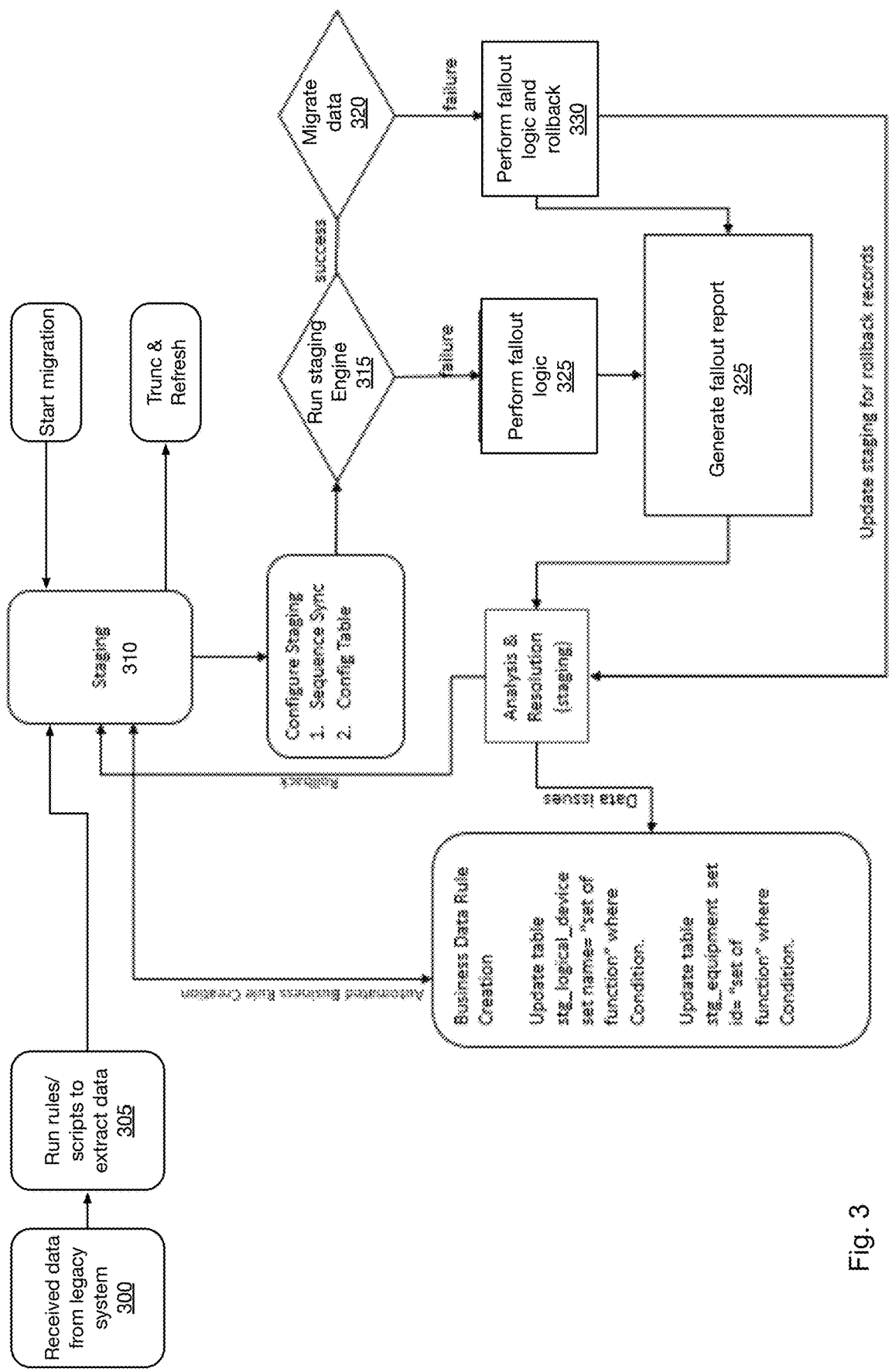
FIG. 3 illustrates exemplary operations performed by the DMS in migrating data from a legacy system to a target system.
Figure 4A:
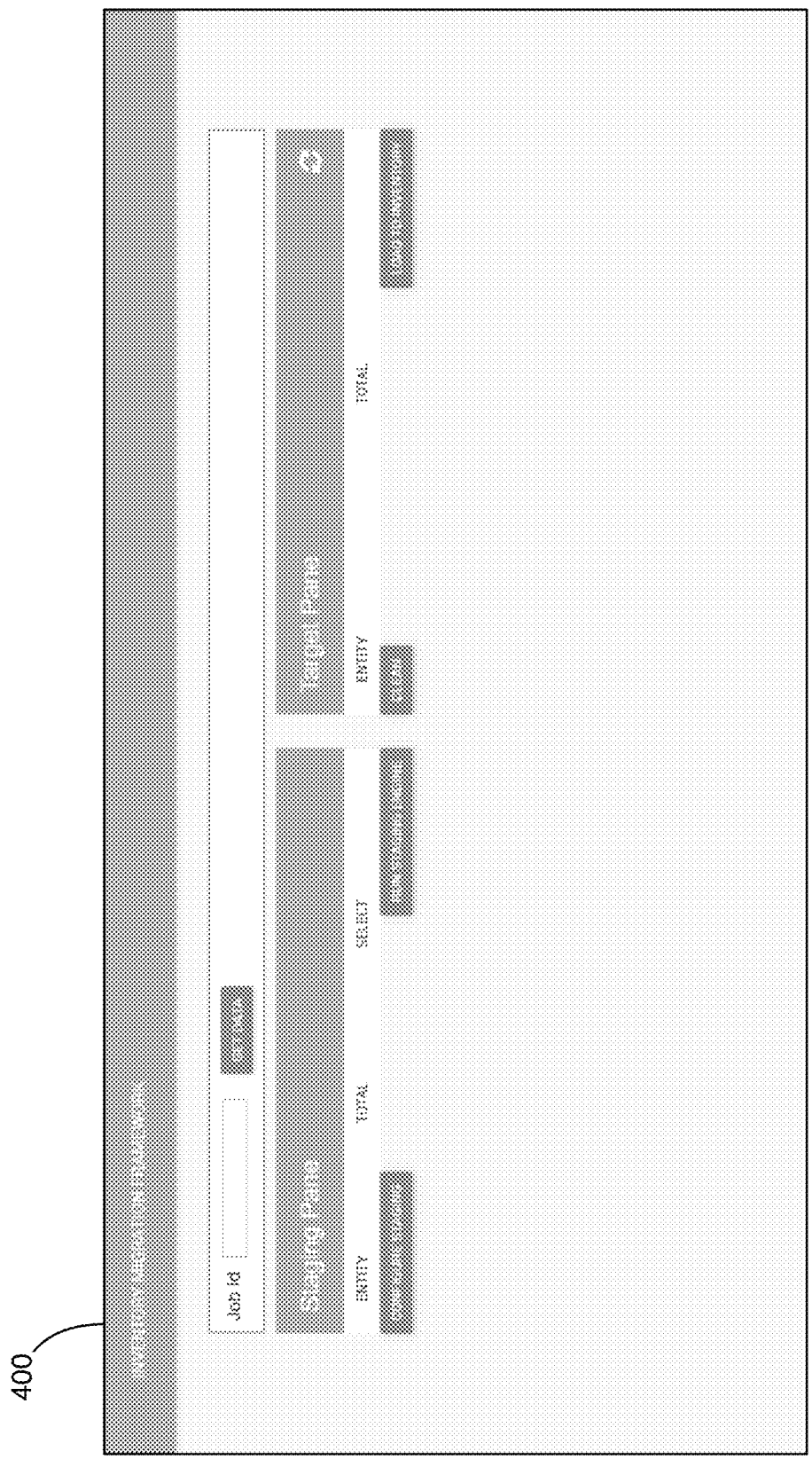
Figure 4B:
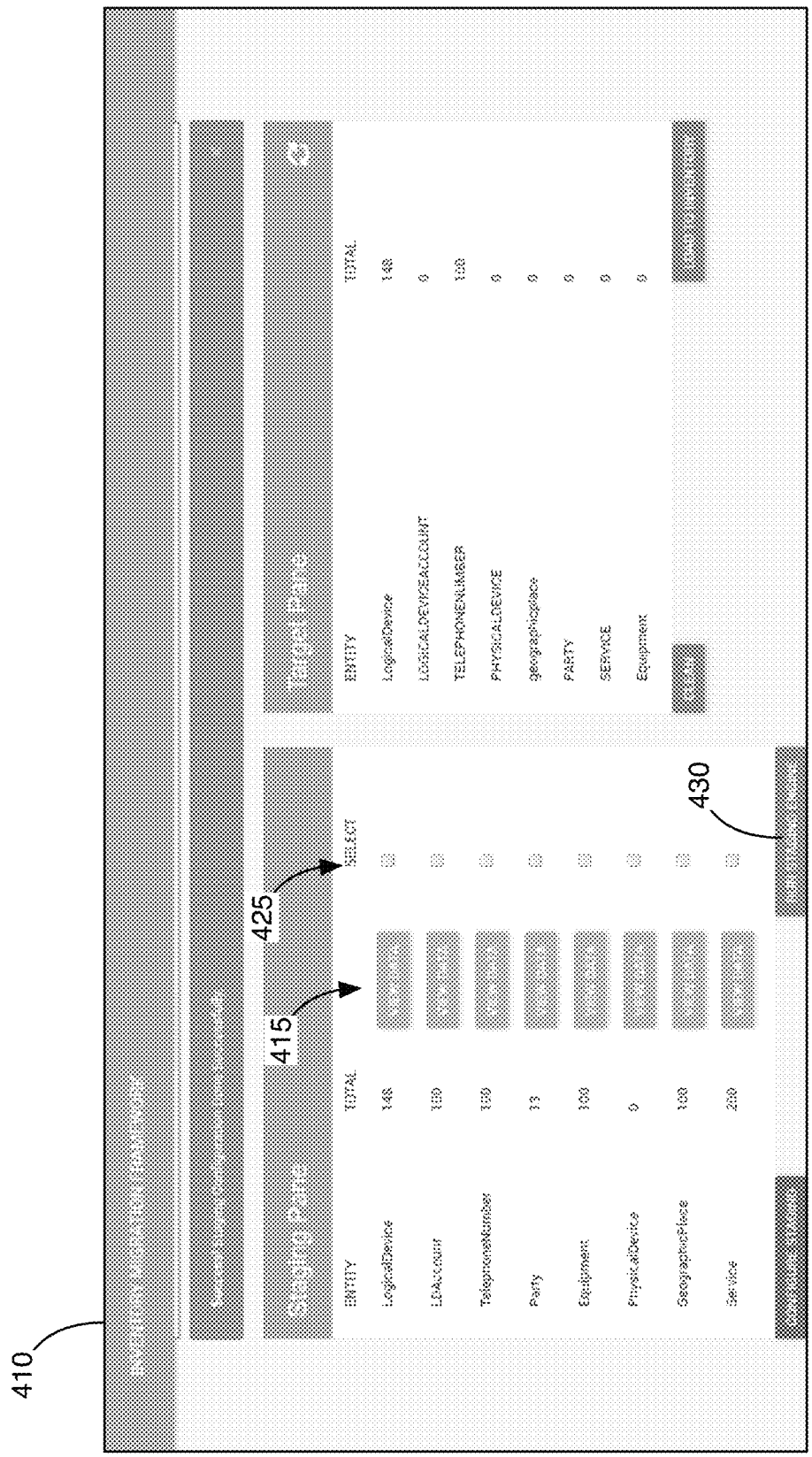
Figure 4C:
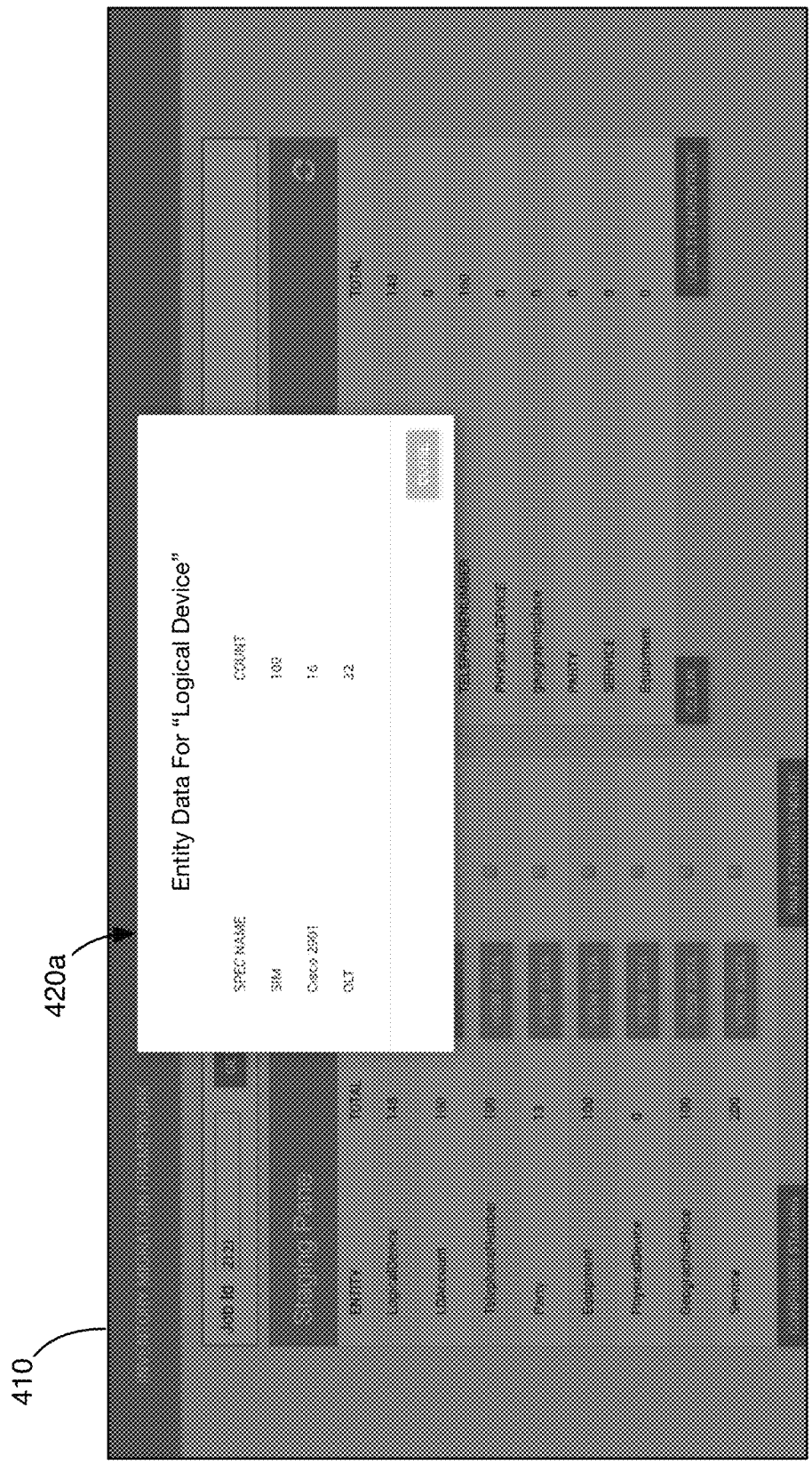
Figure 4D:
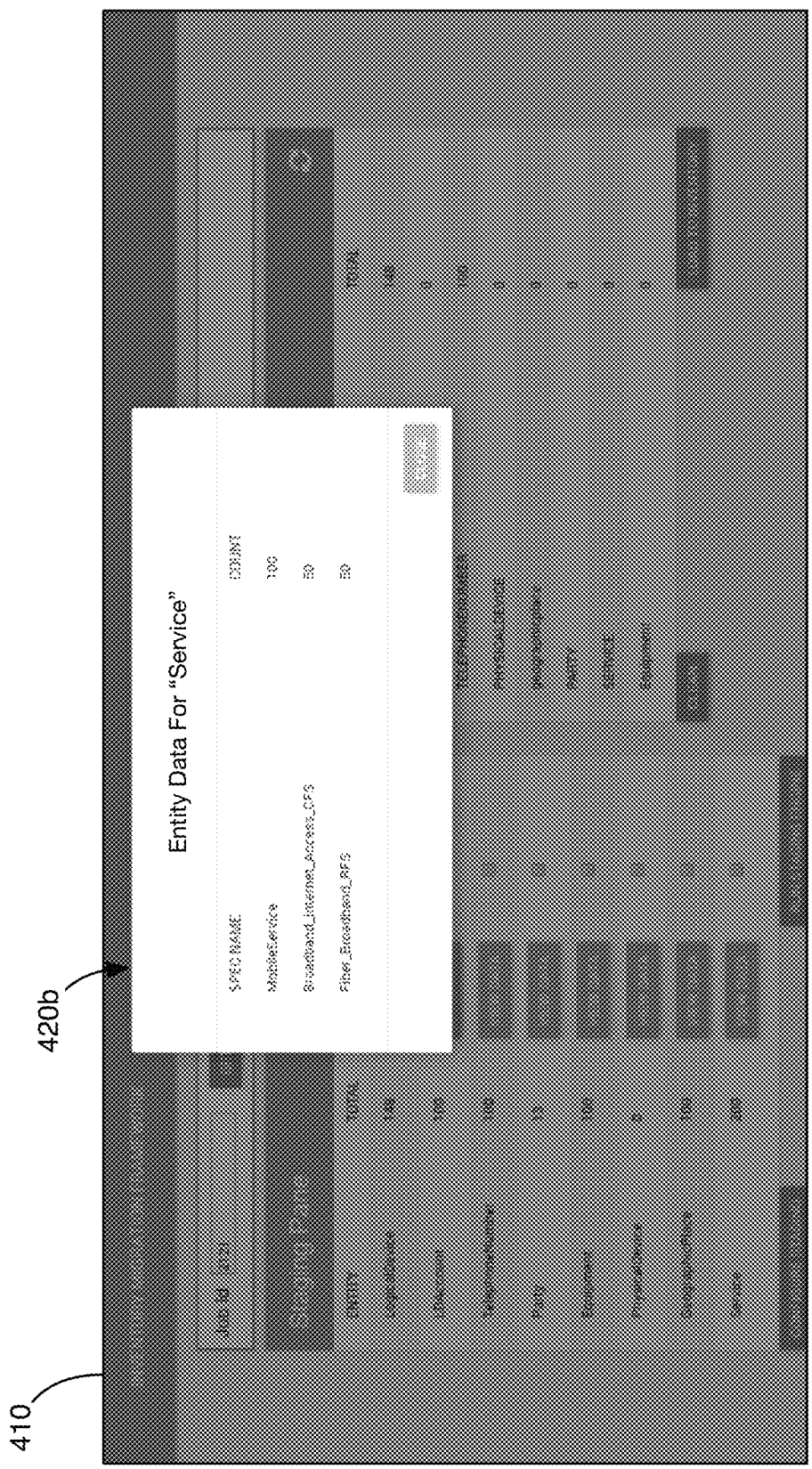
Figure 4E:
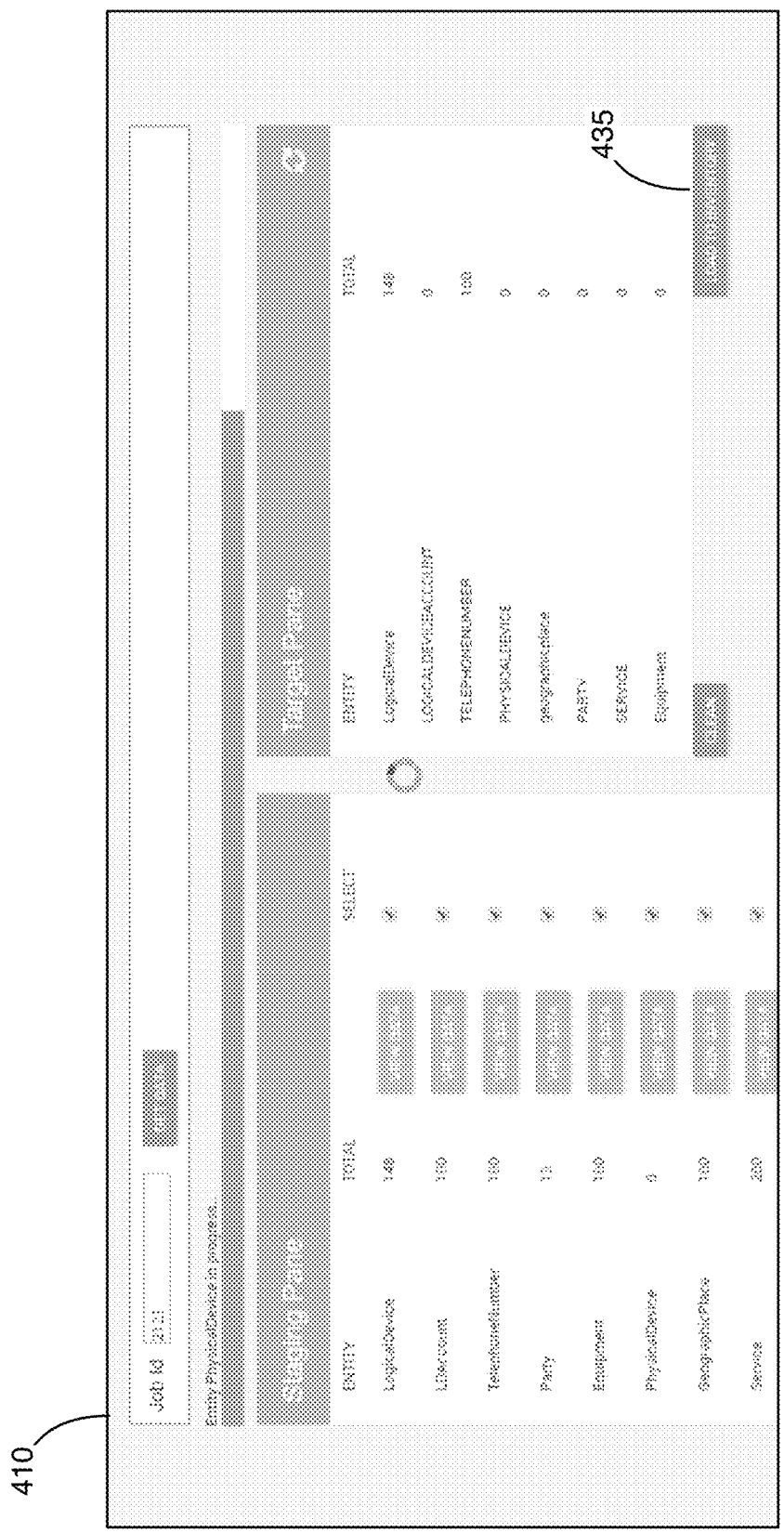

Exemplary operations performed by the DMS 102 in migrating data from one or more legacy systems 104 to one or more target systems 106 are illustrated in the flow diagram of FIG. 3. In this regard, the operations may be implemented via instruction code stored in non-transitory computer readable media 127 that resides within the subsystems configured to cause the respective subsystems to perform the operations illustrated in the figures and discussed herein. The operations are best understood with reference to the exemplary interfaces illustrated in FIGS. 5A-5F.

At an initial stage, a user may be presented with the user interface 500 of FIG. 5A. The user may select a control on the user interface 500 to cause the DMS 102 to begin migration operations. For example, according to the flow diagram, at operations 300 and 305, legacy data may be received from a legacy system 104 and processed according to rules/scripts that convert the data according to a schema associated with the legacy system 104, and communicate the converted data to the staging area database at operation 310.

At operation 310, the user may be presented with the user interface 510 of FIG. 5B. The user interface 510 illustrates various entities/tables that may have been generated by the rules/scripts at operation 305 and stored in the staging area database 120 along with the number records stored in each table. The exemplary entities illustrated correspond to entities associated with typical telecom data systems. For example, entities for which data may be stored include LogicalDevice, LDA Account, TelephoneNumber, Party, Equipment, PhysicalDevice, GeorgraphicPlace, and Service.

As shown in FIGS. 5C and 5D, the user may view information associated with each entity by selecting a "view data" control 515 associated with an entity. In response, a pop-up view (520a and 520b) may be presented to the user that shows details related to the selected entity. For example, the "Logical Device" (FIG. 5C) and "Service" (FIG. 5D) entities may include the various subservices illustrated in the figures. The number or count of the number of records for each subservice may be provided.

Returning to FIG. 5B, the user may select one or more entities for migration via selection boxes 525 associated with the entities and may then select a "Run Staging Engine" control 530 which triggers the DMS 102 to being migration operations at operation 315 for the selected entities. In this regard, the DMS 102 begins migration of the information from the staging area database 120 to the localized data database 122. As shown in FIG. 5E, the migration progress of each entity may be displayed.

If at operation 315, migration of data to the localized data database 122 is successful (See FIG. 5F), then the user may select a control 535 on the user interface 510 which triggers the DMS 102 to transfer the data from the localized data database 122 to the target system 106.

If at operation 315, errors occur during the migration (operation 320) or while data is being transferred from the localized data database 122 to the target system 106, fallout analysis logic may be performed at operations 325 and/or 330 by the DMS 102 to determine the cause of the error or errors and a fallout report may be generated by the DMS 102 at operations 335 to specify the nature of the error(s).

The fallout report may be communicated to the user via an interface. For example, an error may occur because data in a field of a table of the localized data is in the incorrect format or a required data is missing from the table. Errors may be generated when duplicate records are detected, when data values are determined to be incorrect (e.g., out of range), when the length of a string or similar data structure is too long, etc. The fallout analysis logic may include in the report a reference to the data causing the problem along with the error caused by the data to facilitate quick resolution to the problem.

In response to detection of errors and generation of an error report, the user may modify a script or section of a script that handles the migration of the data having the issue to correct the issue. For example, the script may be modified to reformat the data into the correct format and/or to provide the missing data. The script may be modified to check for and correct duplicate records, values that are out of range, etc.

After modification of the script, the user may select only the entity for which the transfer error occurred and may re-trigger the staging operations at operation 310. For example, referring to FIG. 5B, the user may deselect any of the selection boxes 525 for which the transfer of information was successful and select only those selection boxes 525 associated with the entities for which a migration failure was determined. In this way, the data that was successfully migrated does not have to be re-migrated, which is the case in the prior art and which consumes extra processing power and network resources. Selection and, therefore, remigration of just those entities for which a migration failure was determined advantageously reduces the number of network transactions that would otherwise be required to transfer the data between the legacy system 104 and target system 106. As a result, the system uses less power and computational resources than prior systems because redundant operations present in those prior systems are eliminated.

FIG. 5 illustrates a computer system 500 that may form part of or implement the systems, environments, devices, etc., described above. The computer system 500 may include a set of instructions 545 that the processor 505 may execute to cause the computer system 500 to perform any of the operations described above. The computer system 500 may operate as a stand-alone device or may be connected, e.g., using a network, to other computer systems or peripheral devices.

In a networked deployment, the computer system 500 may operate in the capacity of a server or as a client computer in a server-client network environment, or as a peer computer system in a peer-to-peer (or distributed) environment. The computer system 500 may also be implemented as or incorporated into various devices, such as a personal computer or a mobile device, capable of executing instructions 545 (sequential or otherwise) causing a device to perform one or more actions. Further, each of the systems described may include a collection of subsystems that individually or jointly execute a set, or multiple sets, of instructions to perform one or more computer operations.

The computer system 500 may include one or more memory devices 510 communicatively coupled to a bus 520 for communicating information. In addition, code operable to cause the computer system to perform operations described above may be stored in the memory 510. The memory 510 may be a random-access memory, read-only memory, programmable memory, hard disk drive or any other type of memory or storage device.

The computer system 500 may include a display 530, such as a liquid crystal display (LCD), a cathode ray tube (CRT), or any other display suitable for conveying information. The display 530 may act as an interface for the user to see processing results produced by processor 505.

Additionally, the computer system 500 may include an input device 525, such as a keyboard or mouse or touchscreen, configured to allow a user to interact with components of system 500.

The computer system 500 may also include a disk or optical drive unit 515. The drive unit 515 may include a computer-readable medium 540 in which the instructions 545 may be stored. The instructions 545 may reside completely, or at least partially, within the memory 510 and/or within the processor 505 during execution by the computer system 500. The memory 510 and the processor 505 also may include computer-readable media as discussed above.

The computer system 500 may include a communication interface 535 to support communications via a network 550. The network 550 may include wired networks, wireless networks, or combinations thereof. The communication interface 535 may enable communications via any number of communication standards, such as 802.11, 802.12, 802.20, WiMAX, cellular telephone standards, or other communication standards.

Accordingly, methods and systems described herein may be realized in hardware, software, or a combination of hardware and software. The methods and systems may be realized in a centralized fashion in at least one computer system or in a distributed fashion where different elements are spread across interconnected computer systems. Any kind of computer system or other apparatus adapted for carrying out the methods described herein may be employed.

The methods and systems described herein may also be embedded in a computer program product, which includes all the features enabling the implementation of the operations described herein and which, when loaded in a computer system, is able to carry out these operations. Computer program as used herein refers to an expression, in a machine-executable language, code or notation, of a set of machine-executable instructions intended to cause a device to perform a particular function, either directly or after one or more of a) conversion of a first language, code, or notation to another language, code, or notation; and b) reproduction of a first language, code, or notation.

While methods and systems have been described with reference to certain embodiments, it will be understood by those skilled in the art that various changes may be made and equivalents may be substituted without departing from the scope of the claims. Therefore, it is intended that the present methods and systems not be limited to the particular embodiment disclosed, but that the disclosed methods and systems include all embodiments falling within the scope of the appended claims.

We claim:

1. A system for migrating data from a legacy system to a target system, the system comprising:
   an input/output (IO) processor configured to receive legacy data from a plurality of different types of legacy systems and to communicate target data to a plurality of different types of target systems;
   a staging area database configured to store legacy data according to a common database schema;
   a localized database configured to store target data according to a target schema that is associated with a target system type;
   a processor in communication with an interface, the staging area database, and the localized database; and
   non-transitory computer readable media in communication with the processor that stores instruction code which, when executed by the processor, causes the processor to:
   determine a target schema associated with a target system type;
   convert the legacy data stored in the staging area database to localized data according to the determined target schema;
   store the localized data in the localized database;
   determine whether an error occurred when converting the legacy data to the localized data;
   transmit, to the interface, a request to modify a script of a plurality of scripts that converted the legacy data to the localized data in response to determining the error occurred;
   receive, from the interface, a selection of at least one entity for which the error occurred in response to the modification of the script;
   cause the staging area database to restore the legacy data corresponding to the received selection of the at least one entity;
   convert the restored legacy data to the localized data; and
   communicate the localized data to the target system.

2. The system according to claim 1, wherein the legacy data includes data associated with different entities of data, wherein each entity of data is structured differently from another, wherein the instruction code includes a plurality of scripts, each script being associated with a different entity and executable by the processor to cause the processor to convert data from the differently structured entities to a common format and to store the converted data to the staging area database.

3. The system according to claim 1, wherein the instruction code includes the plurality of scripts, wherein each script is associated with entities of data to be communicated to the target system, wherein each entity of data is structured differently from another, wherein the plurality of scripts are executable by the processor to cause the processor to convert data stored in a common format within the staging area database to differently structured data associated with different entities and to store the differently structured data to the localized database.

4. The system according to claim 1, wherein the common database schema is associated with an industry type.

5. The system according to claim 1, wherein the common database schema defines the at least one entity, wherein the IO processor is configured to generate a user interface that facilitates the selection of the at least one entity, wherein the instruction code causes the processor to:
   convert legacy data stored in the staging area database that is associated with selected entities to localized data according to the determined target schema; and
   store the localized data associated with the selected entities in the localized database or overwrite previously stored localized data associated with the selected entities in the localized database.

6. The system according to claim 1, wherein, when determining whether the error occurred, the instruction code causes the processor to:
   determine one or both of an error associated with the conversion of legacy data associated with an entity to localized data according to the determined target schema, and an error associated with the communication of the localized data associated with an entity to the target system; and
generate a report that specifies the error.

7. The system according to claim 6, where the error indicates one or more of: that data to be migrated is in an incorrect format, data required to be migrated is missing, data to be migrated is duplicate data, and a length of string data is incorrect.

8. The system according to claim 1, wherein the instruction code causes the processor to communicate the localized data to the target system after all the legacy data received from a given legacy system has been converted according to the target schema and stored in the in the localized database.

9. A method for migrating data from a legacy system to a target system, the method comprising:
receiving, via an input/output (IO) processor, legacy data from a plurality of different types of legacy systems;
storing, to a staging area database, legacy data according to a common database schema;
determining a target schema associated with a target system type;
converting the legacy data stored in the staging area database to localized data according to the determined target schema;
storing the localized data in a localized database;
determining, by a processor, whether an error occurred when converting the legacy data to the localized data;
transmitting, to a user interface, a request to modify a script of a plurality of scripts that converted the legacy data to the localized data in response to determining the error occurred;
receiving, from the user interface, a selection of at least one entity for which the error occurred in response to the modification of the script;
causing the staging area database to restore the legacy data corresponding to the received selection of the at least one entity;
converting the restored legacy data to the localized data; and
communicating the localized data to the target system.

10. The method according to claim 9, wherein the legacy data includes data associated with different entities of data, each entity of data being structured differently from another, wherein the method includes:
executing, the processor, the plurality of scripts, each script being associated with a different entity to convert data from the differently structured entities to a common format, and to store the converted data to the staging area database.

11. The method according to claim 9, wherein the method includes:
executing, by the processor, the a plurality of scripts to convert data stored in a common format within the staging area database to differently structured data associated with different entities, and to store the differently structured data to the localized database, wherein each script is associated with a different entity of data.

12. The method according to claim 9, wherein the common database schema is associated with an industry type.

13. The method according to claim 9, wherein the common database schema defines one or more entities, wherein the method includes:
generating, by the IO processor, the user interface that facilitates selection of one or more of the entities;
receiving, via the user interface, a selection of a subset of entities;
converting legacy data stored in the staging area database that is associated with the selected subset of entities to localized data according to the determined target schema; and
storing the localized data associated with the selected subset of entities in the localized database or overwriting previously stored localized data associated with the selected subset of entities in the localized database.

14. The method according to claim 9, wherein the determination of whether the error occurred includes further comprising:
determining one or both of:
an error associated with the conversion of legacy data associated with an entity to the localized data according to the determined target schema, and
an error associated with the communication of the localized data associated with an entity to the target system and to generate a report that specifies the error.

15. The method according to claim 14, where the error indicates one or more of: that data to be migrated is in an incorrect format, data required to be migrated is missing, data to be migrated is duplicate data, and a length of string data is incorrect.

16. Non-transitory computer readable media having stored thereon instruction code for migrating data from a legacy system to a target system, the instruction code being executable on a machine for causing the machine to perform acts comprising:
receiving legacy data from a plurality of different types of legacy systems;
storing the legacy data to a staging area database according to a common database schema;
determining a target schema associated with a target system type;
converting the legacy data stored in the staging area database to localized data according to the determined target schema;
storing the localized data in a localized database;
determining whether an error occurred when converting the legacy data to the localized data;
transmitting, to a user interface, a request to modify a script of a plurality of scripts that converted the legacy data to the localized data in response to determining the error occurred;
receiving, from the user interface, a selection of at least one entity for which the error occurred in response to the modification of the script;
causing the staging area database to restore the legacy data corresponding to the received selection of the at least one entity;
converting the restored legacy data to the localized data; and
communicating the localized data to the target system.

17. The non-transitory computer readable media according to claim 16, wherein the legacy data includes data associated with different entities of data, each entity of data being structured differently from another, wherein the instruction code causes the machine to perform acts comprising:
executing the plurality of scripts, each script being associated with a different entity to convert data from the differently structured entities to a common format and to store the converted data to the staging area database.

18. The non-transitory computer readable media according to claim 16, wherein the instruction code causes the machine to perform acts comprising:
   executing the plurality of scripts to convert data stored in a common format within the staging area database to differently structured data associated with different entities and to store the differently structured data to the localized database, wherein each script is associated with a different entity of data.

19. The non-transitory computer readable media according to claim 16, wherein the common database schema is associated with an industry type.

20. The non-transitory computer readable media according to claim 16, wherein the common database schema defines the at least one entity, wherein the instruction code causes the machine to perform acts comprising:
   generating the user interface that facilitates the selection of the at least one entity;
   receiving, via the user interface, a selection of a subset of entities;
   converting legacy data stored in the staging area database that is associated with the selected subset of entities to localized data according to the determined target schema; and
   storing the localized data associated with the selected subset of entities in the localized database or overwriting previously stored localized data associated with the selected subset of entities in the localized database.

* * * * *